(12) United States Patent
Arulandu et al.

(10) Patent No.: US 10,468,910 B2
(45) Date of Patent: Nov. 5, 2019

(54) LOAD POWERED VIA SUPPLY OR RE-CHARGEABLE SOURCE

(71) Applicant: SIGNIFY HOLDING B.V., Eindhoven (NL)

(72) Inventors: Kumar Arulandu, Eindhoven (NL); Antonius Petrus Marinus Dingemans, Eindhoven (NL); Jean-Paul Marie Gerard Linnartz, Eindhoven (NL); Marco Haverlag, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 536 days.

(21) Appl. No.: 15/092,966

(22) Filed: Apr. 7, 2016

(65) Prior Publication Data

US 2016/0301247 A1    Oct. 13, 2016

(30) Foreign Application Priority Data

Apr. 7, 2015    (EP) .................................... 15162523

(51) Int. Cl.
*H02J 9/06*    (2006.01)
*H02J 7/00*    (2006.01)
*H02J 9/02*    (2006.01)

(52) U.S. Cl.
CPC .............. *H02J 9/061* (2013.01); *H02J 7/00* (2013.01); *H02J 7/0068* (2013.01); *H02J 9/02* (2013.01)

(58) Field of Classification Search
CPC ...... H02J 9/06; H02J 7/00; H02J 9/061; H02J 7/0068
USPC ......................................................... 307/43
See application file for complete search history.

(56) References Cited

U.S. PATENT DOCUMENTS

| 6,624,599 B1 | 9/2003 | Chen et al. |
| 6,876,159 B1 | 4/2005 | Wu et al. |
| 2012/0068601 A1 | 3/2012 | Rohner et al. |
| 2013/0147397 A1 | 6/2013 | McBryde et al. |

(Continued)

FOREIGN PATENT DOCUMENTS

| EP | 2011213 B1 | 4/2012 |
| JP | H10164770 | 6/1998 |

(Continued)

OTHER PUBLICATIONS

Chih-Lung Shen, et al., "Hybrid-Input Power Supply with PFC (Power Factor Corrector) and MPPT (Maximum Power Joint Tracking) Features for Battery Charging and HB-LED Driving", undated, pp. 1-22.

*Primary Examiner* — Daniel Kessie
*Assistant Examiner* — Swarna N Chowdhuri
(74) *Attorney, Agent, or Firm* — Akarsh P. Belagodu

(57) ABSTRACT

In various embodiments, an apparatus for driving a load is disclosed. In one example, the apparatus comprises an input configured to, in a first state, receive an input signal, an output configured to, in the first state, provide a first output signal to a series arrangement of the load and a source, wherein the first output signal is configured to feed the load and to charge the source with input power provided via the input signal, and a converter configured to, in a second state different from the first state, convert a source signal from the source into a second output signal destined for the load, wherein the second output signal is configured to feed the load with source power provided by the source.

13 Claims, 6 Drawing Sheets

(56) References Cited

U.S. PATENT DOCUMENTS

2014/0132164 A1 5/2014 McBryde et al.
2015/0048685 A1* 2/2015 Wilson ................... H02J 9/062
  307/66

FOREIGN PATENT DOCUMENTS

| JP | 2013110918 A | 6/2013 |
| JP | 2013196759 | 9/2013 |
| WO | 2009127732 A1 | 10/2009 |
| WO | WO2013090277 A1 | 6/2013 |
| WO | WO2013139773 A2 | 9/2013 |

* cited by examiner

LOAD POWERED VIA SUPPLY OR RE-CHARGEABLE SOURCE

TECHNICAL FIELD

The invention relates to an apparatus for driving a load. The invention further relates to a driver comprising an apparatus, to a device comprising a driver, and to a device comprising an apparatus. Examples of such an apparatus are stages of drivers. Examples of such a device are consumer products and professional products.

BACKGROUND

WO 2013/090277 A1 discloses a driver comprising an AC-DC-converter coupled to a mains supply, an emergency lighting module coupled to a battery (a re-chargeable source) and a LED control for driving a LED board (a load). The LED board is be powered via the AC-DC-converter in a normal situation and is powered via the emergency lighting module in an emergency situation. The emergency lighting module can in the normal situation be charged via the AC-DC-converter.

SUMMARY

It is an object of the invention to provide an improved apparatus. Further objects of the invention are to provide a driver and a device.

According to a first aspect, an apparatus is provided for driving a load, the apparatus comprising an input configured to, in a first situation, receive an input signal, an output configured to, in the first situation, provide a first output signal to a series arrangement of the load and a source, wherein the first output signal is configured to feed the load and to charge the source with input power provided via the input signal, and a converter configured to, in a second situation different from the first situation, convert a source signal from the source into a second output signal destined for the load, wherein the second output signal is configured to feed the load with source power provided by the source.

The apparatus comprises an input for, in a first situation, receiving an input signal, which input signal is configured to provide input power. The apparatus comprises an output for, in the first situation, providing a first output signal to a series arrangement of the load and a (re-chargeable) source, which first output signal is configured to feed the load and to charge the source with the input power as provided via the input signal. The apparatus comprises a converter for, in a second situation different from the first situation, converting a source signal from the source into a second output signal destined for the load, which second output signal is configured to feed the load with source power provided by the source. By having introduced the series arrangement of the load and the source, in the first situation, the same first output signal can be used for powering the load and for charging the source. By having introduced the converter for converting the source signal into the second output signal for powering the load, in the second situation the source power from the source can be used for powering the load. As a result, a simple and low complex apparatus has been created for driving a load in two different situations. This is a great technical advantage.

WO 2013/090277 A1 discloses a driver that, compared to the apparatus, has an increased complexity and requires a larger number of components.

US 2012/0068601 A1 discloses a driver that has a first converter for charging an energy storage unit and that has a second converter for converting energy from the energy storage unit into power for the load. This driver has, compared to the apparatus, an increased complexity and requires a larger number of components.

The input signal may be an input current signal, the first output signal may be a first output current signal, the source signal may be a source current signal, and the second output signal may be a second output current signal, but other kinds of signals are not to be excluded.

An embodiment of the apparatus is defined, wherein the first situation is a normal situation whereby the input signal is available, and wherein the second situation is an emergency situation whereby the input signal is not available. In a normal situation, the load is powered by a supply coupled to the input of the apparatus, possibly via another stage. In an emergency situation, the load is powered by the re-chargeable source.

An embodiment of the apparatus is defined, wherein the converter comprises a converter-switch and an inductor, wherein the converter is configured to, in a first mode of the converter-switch, couple the inductor and the source for charging the inductor via the source signal, and wherein the inductor is configured to, in a second mode of the converter-switch, after being charged, provide the second output signal. The converter comprising a combination of a converter-switch and an inductor may for example be a boost converter. The first mode of the converter-switch may for example be a conducting mode and the second mode of the converter-switch may for example be a non-conducting mode.

An embodiment of the apparatus is defined, wherein the converter is configured to regulate a value of the first output signal. Preferably, the converter is not only used for converting the source signal into the second output signal for powering the load in the second situation, but is also used for regulating a value of the first output signal in the first situation. The value of the first output signal may for example be an instantaneous value and/or an average value.

An embodiment of the apparatus is defined, wherein the converter comprises a converter-switch, wherein the converter-switch is configured to, in a first mode of the converter-switch, bypass the series arrangement. Preferably, the value of the first output signal is regulated by bypassing the series arrangement. The first mode of the converter-switch may for example be a conducting mode. In a second mode of the converter-switch, such as for example a non-conducting mode, the series arrangement is not bypassed.

An embodiment of the apparatus is defined, wherein the apparatus further comprises a load-switch, wherein the load-switch is configured to, in a first mode of the load-switch, de-activate the load. Preferably, the load can be activated (switched-on) and de-activated (switched-off). The first mode of the load-switch may for example be a conducting mode. In a second mode of the load-switch, such as for example a non-conducting mode, the load is not de-activated.

An embodiment of the apparatus is defined, wherein the apparatus further comprises a source-switch, wherein the source-switch is configured to, in a first mode of the source-switch, bypass the source. Preferably, the source can be bypassed, to stop the charging in the first situation, for example in case the source has been charged sufficiently.

The first mode of the source-switch may for example be a conducting mode. In a second mode of the source-switch, such as for example a non-conducting mode, the source is not bypassed.

An embodiment of the apparatus is defined, wherein the apparatus further comprises a controller, wherein the controller is configured to control one or more of a converter-switch of the converter and a load-switch and a source-switch. A controller may control a converter-switch of the converter and/or a load-switch and/or a source-switch, for example in response to a detection of a voltage level present at the input or a voltage difference present across the input and/or for example in response to a detection of a voltage level present at the source or a voltage difference present across the source etc.

An embodiment of the apparatus is defined, wherein the input comprises first and second input terminals, wherein the output comprises first and second output terminals configured to be coupled to the load and third and fourth output terminals configured to be coupled to the source, and wherein the converter comprises a converter-switch, an inductor and a first diode, wherein a first contact of the inductor is coupled to the first input terminal, wherein a second contact of the inductor is coupled to a first contact of the first diode and to a first contact of the converter-switch, wherein a second contact of the first diode is coupled to the first output terminal, wherein a second contact of the converter-switch is coupled to the fourth output terminal and to the second input terminal, wherein the third output terminal is coupled to a first contact of a second diode and to the second output terminal, and wherein a second contact of the second diode is coupled to the first input terminal.

An embodiment of the apparatus is defined, wherein the apparatus comprises a third diode and a source-switch, wherein the second and third output terminals are coupled to each other via the third diode, wherein a first contact of the third diode is coupled to a first contact of the source-switch and to the second output terminal, wherein a second contact of the source-switch is coupled to the second input terminal, and wherein a second contact of the third diode is coupled to the third output terminal. A source-switch can be introduced for bypassing the source, to stop the charging in the first situation, for example in case the source has been charged sufficiently.

An embodiment of the apparatus is defined, wherein the apparatus comprises a load-switch, wherein the load-switch is coupled to the first and second output terminals. A load-switch can be introduced for activating (switching on) and de-activating (switching-off) the load.

An embodiment of the apparatus is defined, wherein the apparatus comprises an input-capacitor coupled to the first and second input terminals, and/or a load-capacitor coupled to the first and second output terminals, and/or a source-capacitor coupled to the third and fourth output terminals. An input-capacitor, a load-capacitor and a source-capacitor may each have an energy storage function and/or a filtering function.

According to a second aspect, a driver is provided comprising the apparatus as defined above and further comprising a first stage, wherein the first stage is configured to convert a supply signal into the input signal for the apparatus, and wherein the apparatus is configured to form a second stage of the driver. A supply signal may originate from a supply such as for example a mains supply.

According to a third aspect, a device is provided comprising the driver as defined above and further comprising one or more of the load and the source.

According to a fourth aspect, a device is provided comprising the apparatus as defined above and further comprising one or more of the load and the source.

The load may for example comprise a light circuit, such as for example a light emitting diode circuit that comprises one or more light emitting diodes of whatever kind and in whatever combination.

Embodiments of the driver and the device correspond with the embodiments of the apparatus. And (parts of) the embodiments of the apparatus may be combined with (parts of) other embodiments of the apparatus.

A basic idea is that in a first situation a first output signal is to be provided to a series arrangement of a load and a source for normal powering purposes and charging purposes, and that in a second situation a source signal from the source is to be converted into a second output signal destined for the load for emergency powering purposes.

A problem to provide an improved apparatus has been solved advantageously in that the apparatus is simple and low complex and requires relatively few components. Further advantages are that such an apparatus can be easily given an improved robustness and an improved fail-safety.

These and other aspects of the invention will be apparent from and elucidated with reference to the embodiments described hereinafter.

DETAILED DESCRIPTION OF EMBODIMENTS

Figure 1:
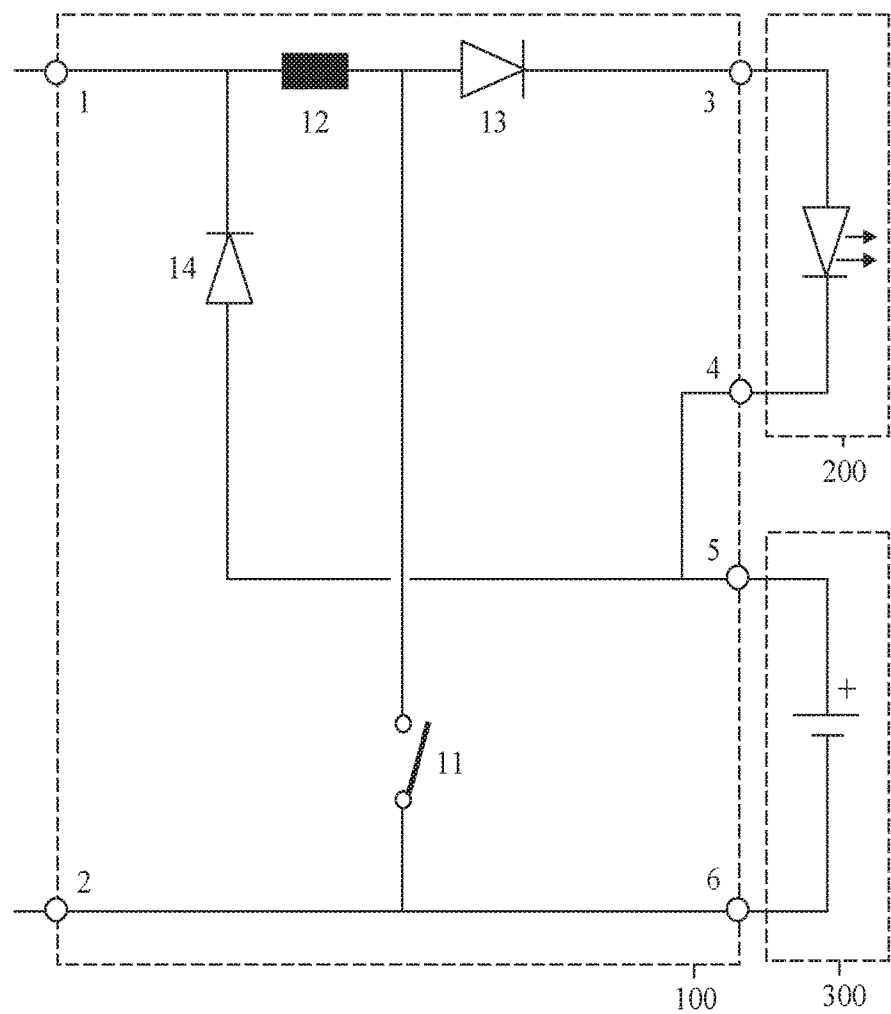
FIG. 1 shows a general embodiment of an apparatus.

In the FIG. 1, a general embodiment of an apparatus is shown. The apparatus 100 comprises a first input terminal 1 coupled to a first contact of an inductor 12 and to a cathode of a diode 14. A second contact of the inductor 12 is coupled to an anode of a diode 13 and to a first contact of a converter-switch 11. A cathode of the diode 13 is coupled to a first output terminal 3. The first output terminal 3 is coupled to a first terminal of a load 200 such as for example a light circuit. A second output terminal 4 is coupled to a second terminal of the load 200. A third output terminal 5 is coupled to a first (positive) terminal of a re-chargeable source 300 such as a re-chargeable battery. A fourth output terminal 6 is coupled to a second (negative) terminal of the source 300. A second contact of the converter-switch 11 is coupled to the fourth output terminal 6 and to a second input terminal 2. The second and third output terminals 4, 5 are coupled to each other such that the load 200 and the source 300 form a series arrangement. The third output terminal 5 is further coupled to an anode of the diode 14.

Figure 2:
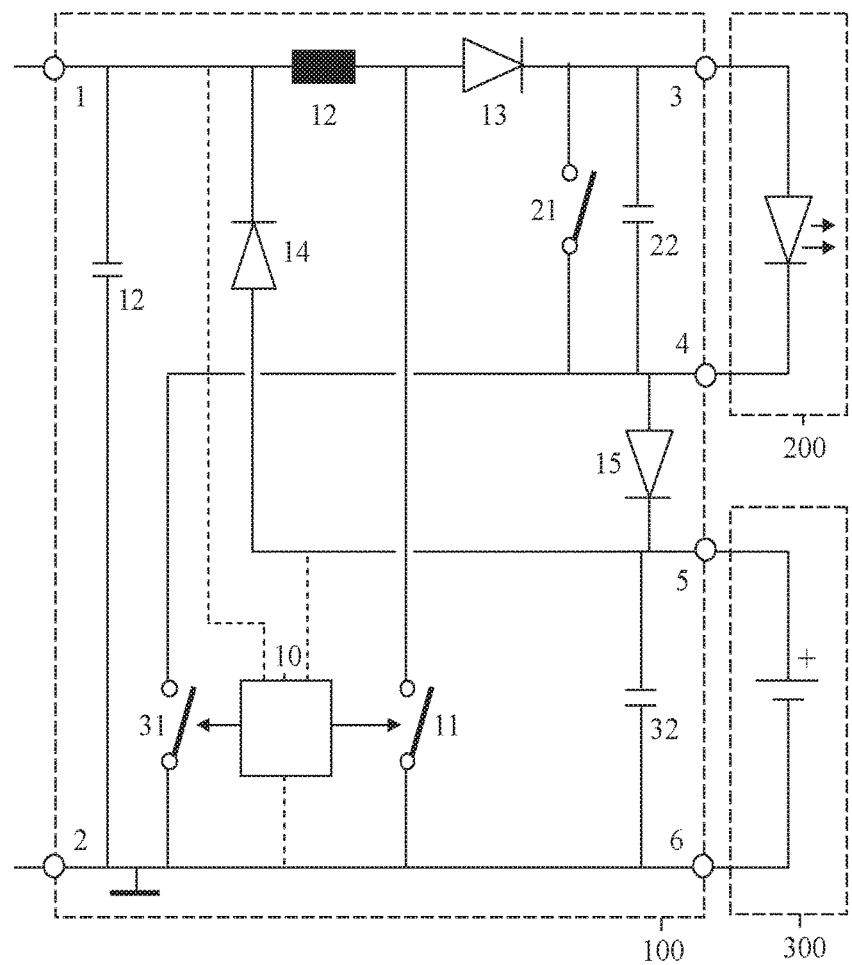
FIG. 2 shows a more specific embodiment of the apparatus.

In the FIG. 2, a more specific embodiment of the apparatus is shown. This more specific embodiment differs from the general embodiment shown in the FIG. 1 in that the apparatus 100 further comprises a diode 15, a load-switch 21, a source-switch 31 and a controller 10. An anode of the diode 15 is coupled to the second output terminal 4, and a cathode of the diode 15 is coupled to the third output terminal 5, such that the load 200 and the source 300 still form a series arrangement. The apparatus 100 further comprises the load-switch 21 coupled to the first and second output terminals 3, 4, and the source-switch 31 coupled to the anode of the diode 15 and to the second input terminal 2. The apparatus 100 further comprises the controller 10 for controlling the converter-switch 11 and the source-switch 31. The load-switch 21 may be controlled by the controller 10, or may alternatively be controlled otherwise, such as for example by hand.

The apparatus 100 may further comprise an input-capacitor 12 coupled to the first and second input terminals 1, 2, and a load-capacitor 22 coupled to the first and second output terminals 3, 4, and a source-capacitor 32 coupled to the third and fourth output terminals 5, 6.

The apparatus 100 drives the load 200, as follows. In a first situation, such as for example a normal situation, via an input 1, 2, an input signal is received. In this first situation, via an output 3-6, a first output signal is provided to the series arrangement of the load 200 and the source 300. This first output signal is configured to feed the load 200 and to charge the source 300 with input power provided via the input signal. In a second situation such as for example an emergency situation, the converter 11-13 comprising the converter-switch 11, the inductor 12 and the diode 13 converts a source signal from the source 300 into a second output signal destined for the load 200. This second output signal is configured to feed the load 200 with source power provided by the source 300.

Thereto, the converter 11-13 may be configured to, in a first mode of the converter-switch 11, such as for example a conducting mode of the converter-switch 11, couple the inductor 12 and the source 300 for charging the inductor 12 via the source signal from the source 300. The inductor 12 may be configured to, in a second mode of the converter-switch 11, such as for example a non-conducting mode of the converter-switch 11, after being charged, provide the second output signal to the load 200.

In addition, the converter 11-13 may preferably be further configured to regulate a value of the first output signal. Thereto, the converter-switch 11 may be configured to, in the first mode of the converter-switch 11, such as for example a conducting mode of the converter-switch 11, bypass the series arrangement.

The load-switch 21 may be configured to, in a first mode of the load-switch 21, such as for example a conducting mode of the load-switch 21, de-activate the load 200. The source-switch 31 may be configured to, in a first mode of the source-switch 31, such as for example a conducting mode of the source-switch 31, bypass the source 300. The controller 10 may be configured to control one or more of the converter-switch 11 and the load-switch 21 and the source-switch 31.

The driving of the load 200 in the first, normal situation and in the second, emergency situation will be explained in greater detail in view of the FIG. 3-5.

Figure 3:
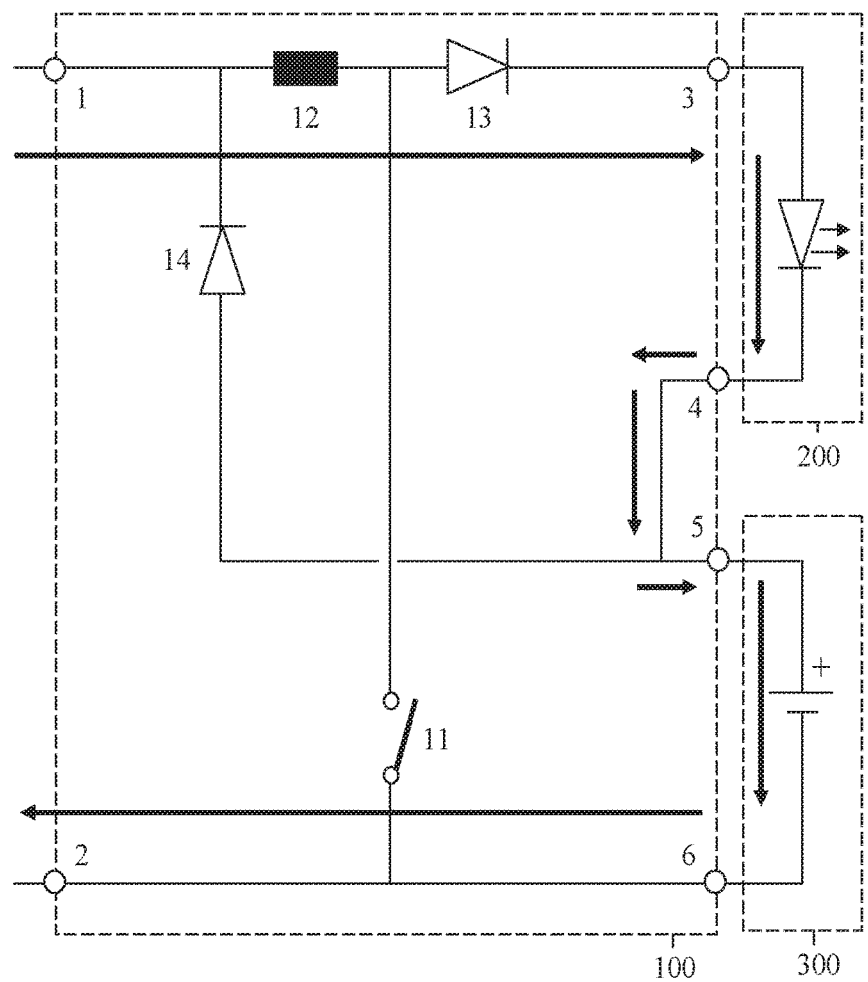
FIG. 3 shows a current flow in a first situation.

In the FIG. 3, a current flow is shown for a first situation. The converter-switch 11 is in the second, non-conducting mode. The input signal such as an input current signal enters the apparatus 100 at the first input terminal 1, passes the inductor 12 and the diode 13, becomes the first output signal such as a first output current signal at the first output terminal 3, passes the load 200, the second and third output terminals 4, 5, the source 300 and enters the apparatus 100 at the fourth output terminal 6 and leaves the apparatus 100 at the second input terminal 2. This way, the load 200 is powered and the source 300 is charged simultaneously. The source 300 is charged owing to the fact that the first output current signal flows through the source 300 from the positive terminal to the negative terminal.

By bringing the converter-switch 11 in an alternating manner into the first, conducting mode and the second, non-conducting mode, the series arrangement of the load 200 and the source 300 is bypassed and not bypassed in the alternating manner. This way, a value of the first output current signal flowing through the load 200 and the source 300 can be regulated in the first situation, for example for power regulation purposes, such as for example dimming purposes in case the load 200 comprises a light circuit. So, in the first situation, the converter 11-13 may be de-activated all the time, and the converter 11-13 may be switched on and off to regulate the value of the first output current signal, by selecting an on-off-duty-cycle.

Figure 4:
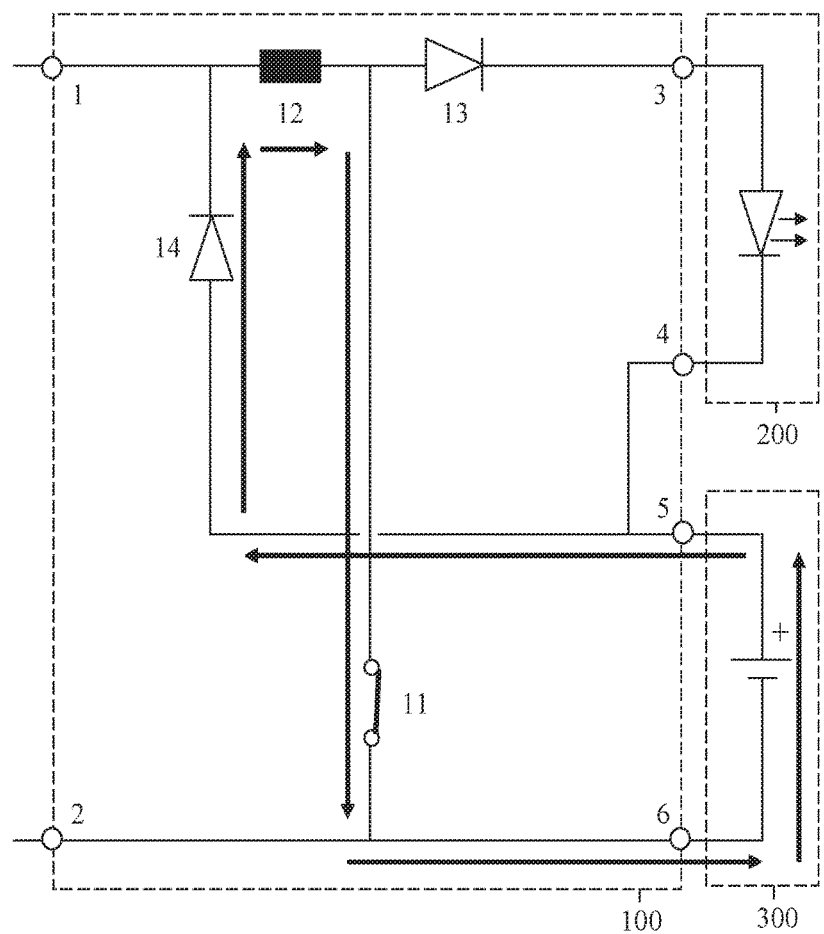
FIG. 4 shows a current flow in a first part of a second situation.

In the FIG. 4, a current flow is shown for a first part of a second situation. In the second situation (mains power failure), the input signal such as an input current signal is absent. In the first part of the second situation, the converter-switch 11 is in the first, conducting mode, whereby the source 300 has been charged in the previous, first situation. As a result, the source signal such as a source current signal flows from the source 300 through the diode 14, the inductor 12 and the converter-switch 11 back to the source 300. Thereby the inductor 12 is charged and the source 300 is discharged. The source 300 is discharged owing to the fact that the source current signal flows through the source 300 from the negative terminal to the positive terminal.

Figure 5:
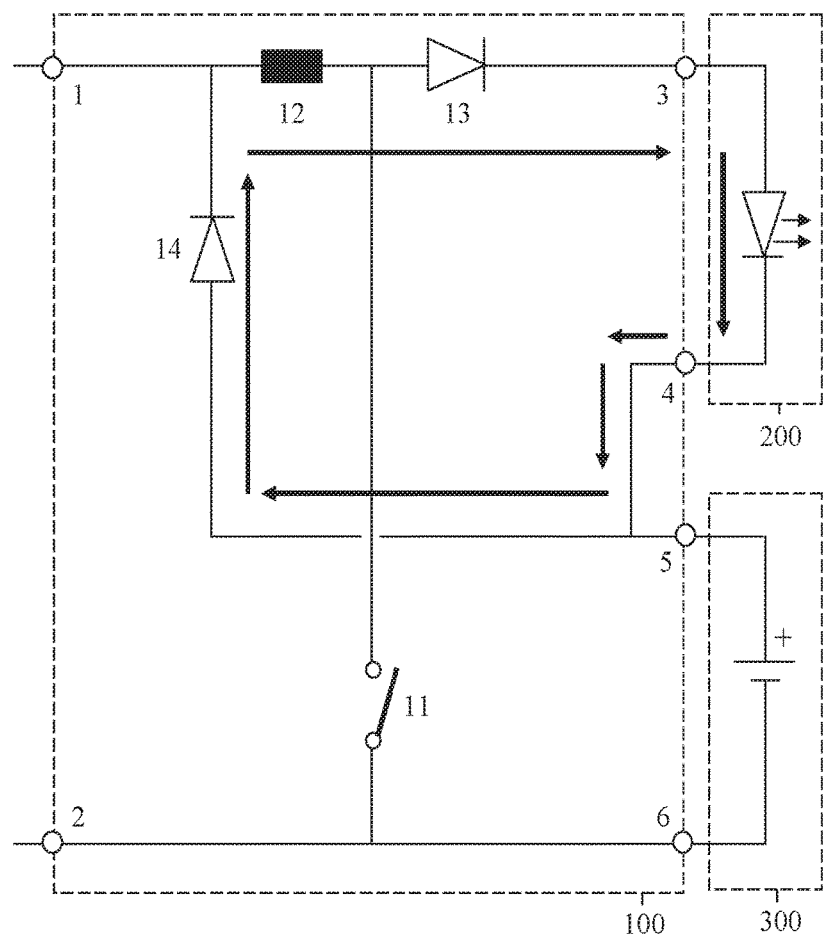
FIG. 5 shows a current flow in a second part of the second situation.

In the FIG. 5, a current flow is shown in a second part of the second situation. Again, in the second situation (mains power failure), the input signal such as an input current signal is absent. In the second part of the second situation, the converter-switch 11 is in the second, non-conducting mode, and the inductor 12 has been charged in the previous, first part of the second situation. As a result, an inductor signal such as an inductor current signal flows from the inductor 12 through the diode 13, becomes the second output signal such a second current output signal at the first output terminal 3, and flows through the load 200 and the diode 14 back to the inductor 12. Thereby the load 200 is powered and the inductor 12 is discharged.

So, by switching the converter-switch 11 in the second situation on and off, the inductor 12 is charged by the source 300, and the charged inductor 12 powers the load 200. Advantageously in addition, by switching the converter-switch 11 in the first situation on and off, an amount of power destined for the series arrangement of the load 200 and the source 300 is regulated.

The controller 10 may control the converter-switch 11 and/or the load-switch 21 and/or the source-switch 31. The control of the converter-switch 11 and/or the source-switch 31 may for example be performed in response to a detection of a voltage level present at the first input terminal 1 or a voltage difference present between the first and second input terminals 1, 2 and/or for example in response to a detection of a voltage level present at the third output terminal 5 or a voltage difference present between the third and fourth output terminals 5, 6 etc.

Figure 6:
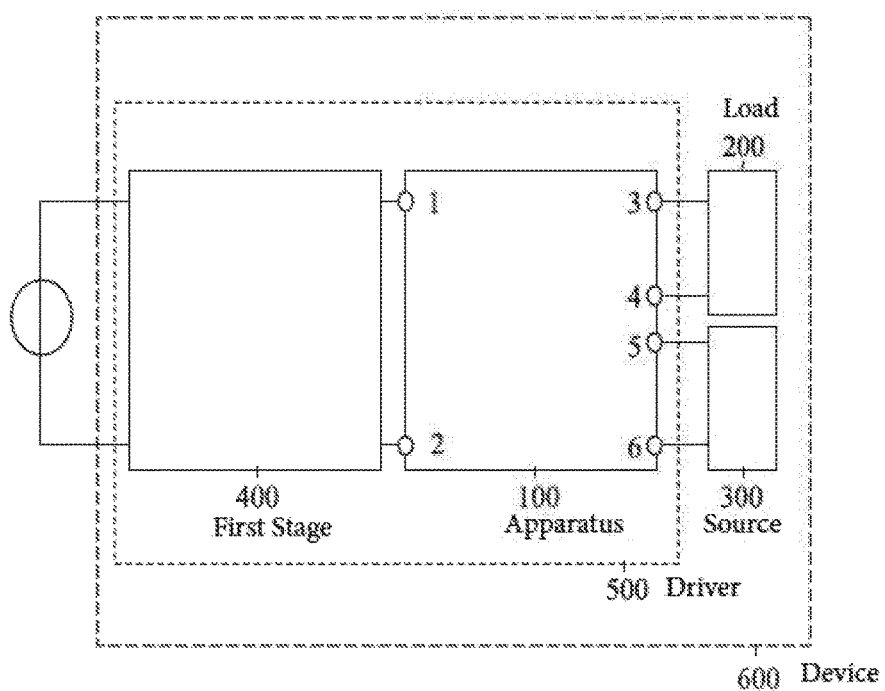
FIG. 6 shows a driver and a device.

In the FIG. 6, a driver and a device are shown. The driver 500 may comprise a first stage 400 comprising an input coupled to a supply, such as a mains supply, for receiving a supply signal from the supply. The first stage 400 comprises an output coupled to the input 1, 2 of the apparatus 100, which apparatus 100 in this case forms a second stage of the driver 500. The device 600 may comprise the driver 500 and may comprise one or more of the load 200 and the source 300. Alternatively, the device 600 may comprise the apparatus 100 and may comprise one or more of the load 200 and the source 300. A series arrangement of the load 200 and the source 300 is coupled to the output 3-6 of the apparatus 100.

The first stage 400 may preferably generate an output current signal having a substantially constant value. In that case, the input signal entering the apparatus 100 will be an input current signal having the substantially constant value, whereby the first stage 400 may be provided with an output-capacitor and/or whereby the apparatus 100 may be provided with the input-capacitor 12 shown in the FIG. 2 to allow fluctuations in the input current signal to be possible.

Each switch 11, 21, 31 can be realized through one or more transistors of whatever kind and in whatever combination or through any other kind of switch. Each switch 11, 21, 31 may be provided with a current limitation function or may be combined with a current limiting element. Each diode may be replaced by a switch that substantially shows the same conducting and non-conducting modes as the diode. So, a diode may comprise a real diode or a part of a transistor or a switch showing a similar operation as the diode. First and second elements can be coupled indirectly via a third element and can be coupled directly without the third element being in between.

Summarizing, apparatuses 100 for driving loads 200 receive input signals in first, normal situations and provide first output signals to series arrangements of the loads 200 and re-chargeable sources 300 to feed the loads 200 and charge the sources 300 with input power provided via the input signals. In second, emergency situations, converters 11-13 convert source signals from the sources 300 into second output signals destined for the loads 200 to feed the loads 200 with source power provided by the sources 300. The converters 11-13 may comprise converter-switches 11 and inductors 12 and diodes 13, and, in first modes of the converter-switches 11, couple the inductors 12 and the sources 300 for charging the inductors 12 via the source signals. In second modes of the converter-switches 11, the inductors 12, after being charged, provide the second output signals. The converters 11-13 may further regulate values of the first output signals. Load-switches 21 may de-activate the loads 200 and source-switches 31 may bypass the sources 300.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. An apparatus for driving a load, the apparatus comprising: an input configured to, in a first state, receive an input signal, an output configured to, in the first state, provide a first output signal to a series arrangement of the load and a source, wherein the first output signal is configured to feed the load and to charge the source with input power provided via the input signal, and a converter comprising a conductor-switch, a first diode and an inductor, the converter configured to, in a second state different from the first state, convert a source signal from the source into a second output signal destined for the load, wherein the second output signal is configured to feed the load with source power provided by the source, and wherein the converter is further configured to regulate a value of the first output signal by at least alternating the conductor-switch between a first mode and a second mode, such that in the first mode the converter bypasses the series arrangement, wherein in the first mode, the converter couples the inductor and the source for charging the inductor, and in the second mode, the inductor after being charged provides the second output signal to the load;

wherein the input comprises first and second input terminals, wherein the output comprises first and second output terminals configured to be coupled to the load and third and fourth output terminals configured to be coupled to the source, and wherein a first contact of the inductor is coupled to the first input terminal, wherein a second contact of the inductor is coupled to a first contact of the first diode and to a first contact of the converter-switch, wherein a second contact of the first diode is coupled to the first output terminal, wherein a second contact of the converter-switch is coupled to the fourth output terminal and to the second input terminal, wherein the third output terminal is coupled to a first contact of a second diode and to the second output terminal, and wherein a second contact of the second diode is coupled to the first input terminal.

2. The apparatus as defined in claim 1, wherein the first state is a normal state whereby the input signal is available, and wherein the second state is an emergency state whereby the input signal is not available.

3. The apparatus as defined in claim 1, wherein the converter is configured to, in the first mode of the converter-switch, couple the inductor and the source for charging the inductor via the source signal, and wherein the inductor is configured to, in the second mode of the converter-switch, after being charged, provide the second output signal.

4. The apparatus as defined in claim 1, wherein the converter-switch is configured to, in a first mode of the converter-switch, bypass the series arrangement.

5. The apparatus as defined in claim 1, wherein the apparatus further comprises a load-switch, wherein the load-switch is configured to, in a first mode of the load-switch, de-activate the load.

6. The apparatus as defined in claim 1, wherein the apparatus further comprises a source-switch, wherein the source-switch is configured to, in a first mode of the source-switch, bypass the source.

7. The apparatus as defined in claim 1, wherein the apparatus further comprises a controller, wherein the controller is configured to control one or more of a converter-switch of the converter and a load-switch and a source-switch.

8. The apparatus as defined in claim 1, wherein the apparatus comprises a third diode and a source-switch, wherein the second and third output terminals are coupled to each other via the third diode, wherein a first contact of the third diode is coupled to a first contact of the source-switch and to the second output terminal, wherein a second contact of the source-switch is coupled to the second input terminal, and wherein a second contact of the third diode is coupled to the third output terminal.

9. The apparatus as defined in claim 1, wherein the apparatus comprises a load-switch, wherein the load-switch is coupled to the first and second output terminals.

10. The apparatus as defined in claim 1, wherein the apparatus comprises an input-capacitor coupled to the first and second input terminals, and/or a load-capacitor coupled to the first and second output terminals, and/or a source-capacitor coupled to the third and fourth output terminals.

11. A driver comprising the apparatus as defined in claim 1 and further comprising a first stage, wherein the first stage is configured to convert a supply signal into the input signal for the apparatus, and wherein the apparatus is configured to form a second stage of the driver.

12. A device comprising the driver as defined in claim 11 and further comprising one or more of the load and the source.

13. A device comprising the apparatus as defined in claim 1 and further comprising one or more of the load and the source.

\* \* \* \* \*